US 9,659,079 B2

United States Patent
Vasantham et al.

(10) Patent No.: US 9,659,079 B2
(45) Date of Patent: May 23, 2017

(54) SHARD DETERMINATION LOGIC FOR SCALABLE ORDER AND INVENTORY MANAGEMENT ARCHITECTURE WITH A SHARDED TRANSACTIONAL DATABASE

(71) Applicant: Wal-Mart Stores, Inc., Bentonville, AR (US)

(72) Inventors: Madhavan Kandhadai Vasantham, Foster City, CA (US); Sreekanth Sreedhararaj, Foster City, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 375 days.

(21) Appl. No.: 14/319,956

(22) Filed: Jun. 30, 2014

(65) Prior Publication Data
US 2015/0347554 A1    Dec. 3, 2015

Related U.S. Application Data

(63) Continuation-in-part of application No. 14/292,522, filed on May 30, 2014, and a continuation-in-part of application No. 14/292,553, filed on May 30, 2014, and a continuation-in-part of application No. 14/292,530, filed on May 30, 2014.

(51) Int. Cl.
| | | |
|---|---|---|
| *G06F 7/00* | (2006.01) | |
| *G06F 17/30* | (2006.01) | |
| *G06Q 10/08* | (2012.01) | |
| *G06F 7/24* | (2006.01) | |

(52) U.S. Cl.
CPC .. *G06F 17/30584* (2013.01); *G06F 17/30327* (2013.01); *G06F 17/30864* (2013.01); *G06Q 10/087* (2013.01); *G06F 7/24* (2013.01)

(58) Field of Classification Search
CPC .................................................. G06Q 10/087
USPC .................................. 705/28; 707/752, 949
See application file for complete search history.

(56) References Cited

U.S. PATENT DOCUMENTS

| | | | |
|---|---|---|---|
| 7,856,440 B2 | 12/2010 | Alpern | |
| 8,037,024 B1* | 10/2011 | Bozkaya | G06F 17/30581 |
| | | | 707/637 |
| 8,189,964 B2 | 5/2012 | Flynn | |
| 8,229,945 B2 | 7/2012 | Dinker | |
| 8,380,738 B2 | 2/2013 | Tatemura | |
| 8,458,209 B2 | 6/2013 | Clarke | |
| 8,600,975 B1 | 12/2013 | Cao | |

(Continued)

FOREIGN PATENT DOCUMENTS

EP    2637111 A1    9/2013

*Primary Examiner* — Hunter Wilder
(74) *Attorney, Agent, or Firm* — Bryan Cave LLP

(57) ABSTRACT

A store computer system is provided. The computer system includes a sharded store transactional database such as an order or inventory database. The database may include a first database shard which stores a first group of order or inventory data and a second database shard which stores a second group of order or inventory data which is different than the first group of data. The computer system may include a store order management computer system that implements a shard determination module which is programmed to receive a query regarding an order or item associated with the store, identify a database shard associated with the order or item from data in the query, and communicate data regarding the order or item to or from the identified database shard.

12 Claims, 14 Drawing Sheets

(56) References Cited

U.S. PATENT DOCUMENTS

| | | | |
|---|---|---|---|
| 8,666,991 B2 | 3/2014 | Peters | |
| 8,688,697 B1 * | 4/2014 | Nayar | G06Q 30/0601 |
| | | | 707/731 |
| 2011/0202929 A1 | 8/2011 | Schleimer | |
| 2012/0254175 A1 | 10/2012 | Horowitz | |
| 2012/0310878 A1 | 12/2012 | Vuksan | |
| 2013/0073581 A1 * | 3/2013 | Sandholm | G06F 17/30545 |
| | | | 707/769 |
| 2013/0290249 A1 | 10/2013 | Merriman | |
| 2014/0012814 A1 | 1/2014 | Bercovici | |
| 2014/0108421 A1 * | 4/2014 | Isaacson | G06F 17/30575 |
| | | | 707/747 |
| 2014/0122510 A1 | 5/2014 | Namkoong | |
| 2014/0156632 A1 | 6/2014 | Yu | |
| 2014/0372489 A1 * | 12/2014 | Jaiswal | G06F 17/30371 |
| | | | 707/812 |
| 2015/0302406 A1 * | 10/2015 | Pastore | G06Q 40/02 |
| | | | 705/44 |

* cited by examiner

SHARD DETERMINATION LOGIC FOR SCALABLE ORDER AND INVENTORY MANAGEMENT ARCHITECTURE WITH A SHARDED TRANSACTIONAL DATABASE

PRIORITY

The present application is a continuation in part of U.S. application Ser. No. 14/292,522, filed May 30, 2014, which is expressly incorporated herein by reference in its entirety. The present application is a continuation in part of U.S. application Ser. No. 14/292,553, filed May 30, 2014, which is expressly incorporated herein by reference in its entirety. The present application is a continuation in part of U.S. application Ser. No. 14/292,530, filed May 30, 2014, which is expressly incorporated herein by reference in its entirety.

BACKGROUND INFORMATION

Field of the Disclosure

The present invention relates to transactional databases in store order and inventory management systems. In particular, examples of the present invention relate to a system with shard determination logic to manage dataflow to database shards in a transactional database. The system may increase bandwidth for managing orders and inventory in a store. The system may also increase bandwidth for interactions with other store systems such as a website or customer order interface, the order management systems, etc. Such a system improves the performance of the transactional database in taking, managing, and filling customer orders.

Background

Many stores are providing increased venues for making sales to customers. Some stores now provide physical retail locations, online shopping and sales, and even online marketplaces where third party goods are sold to customers. While there are many benefits to implementing these additional venues for sales, these additional sales outlets create corresponding increases in the demands on store computer systems. Properly executed, internet technologies can provide additional venues for communicating with customers and can increase sales and revenue for a store.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
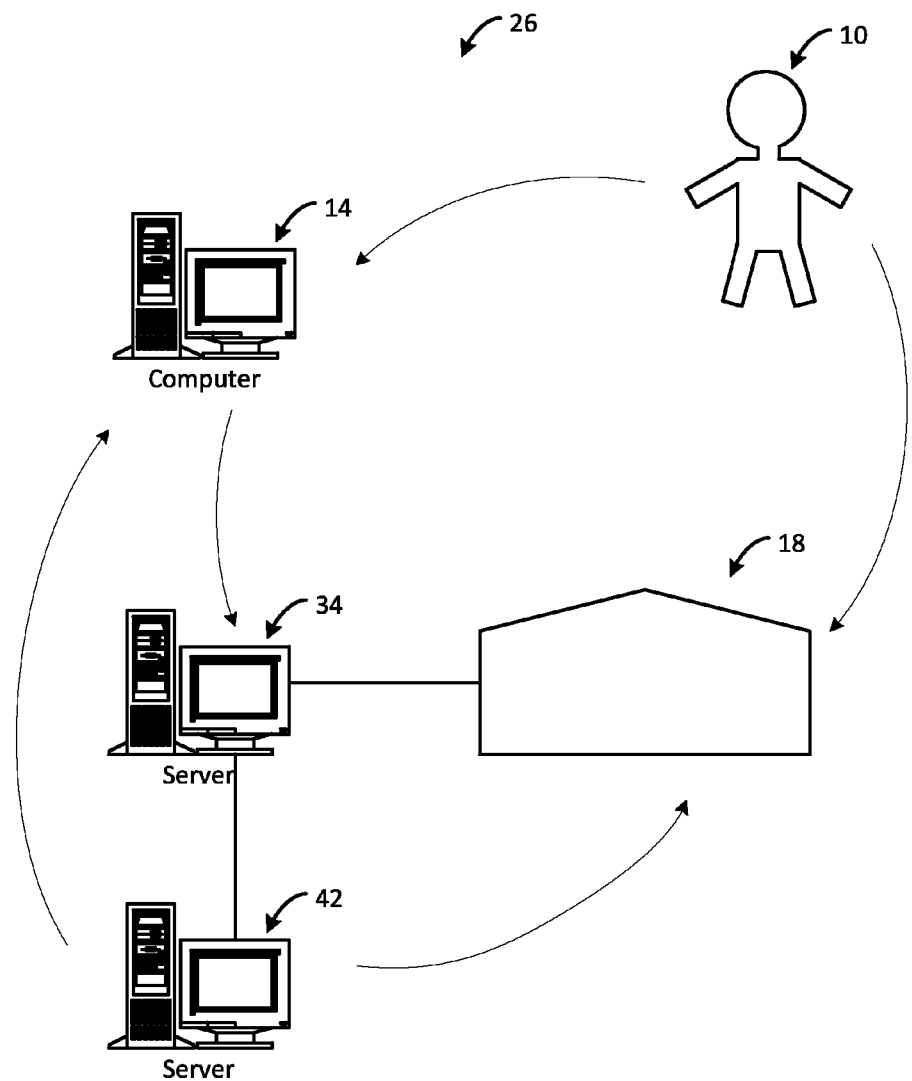
FIG. 1 is a schematic illustrating a computer system in context of an order management system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how to improve transactional database (e.g. order database or inventory database) bandwidth for improving speed and reliability in filling customer orders as well as in allowing customers to place and manage orders over the internet and otherwise purchase from the store. Particularly, the present disclosure describes how a computer system may be used to shard the store order database and/or inventory database for an order management system and manage data flow to the database shards in order to provide increased bandwidth for receiving and managing customer orders and to provide increased accuracy and responsiveness in providing and managing inventory status. This provides increased accuracy and quicker response in allowing customers to place on line order and reduces latency and conflicts for a customer who is using a store order management system.

Many retailers desire to provide additional sales venues such as online ordering and order management for customers. Many retailers desire to allow customers to accurately search store inventory online when locating an item for purchase at a local store location. Store inventory systems, however, frequently do not allow for accurate inventory assessment or are taxed to a point where customers are not able to search inventory or place or manage orders without significant delay or without significant conflicts and technical problems. This is particularly true during periods of heavy sales volume. Some retailers will experience a massive increase in the number of customers and online orders during particular periods of the year, such as holidays. As online ordering and marketplace sales have become much more commonplace, particular retailers may experience tens of thousands of customer visits per minute and thousands of potential orders per minute. Current inventory and order management systems cannot handle such a load. Traditional order and inventory management systems operate on a single database in order to maintain the reliability of the database. Traditional transactional databases have been monolithic databases due to their dynamic nature and the differing demands of transactional database compared to an informational database.

Referring to FIG. 1, a computer system is utilized to provide an inventory management system for a store which is able to handle large numbers of orders per minute for sustained periods of time. The computer system includes a sharded transactional database (such as an order database or an inventory database) along with necessary database management items such as a server, router, and/or shard determination logic which allow sharding of a transactional database. The transactional database interacts with an application layer such as order management application layer or an inventory management application layer.

A store 18 may sell goods to a customer 10 in various different venues. The store 18 may make sales at a physical location. The store 18 may also provide an online storefront where a customer 10 may order items from the store using a customer computer 14. These items may be picked up at the store 18 by the customer 10, or may be shipped to the customer. The store 18 may also provide an online marketplace where items which are not sold in the store retail locations or which are offered by different retailers are offered to customers. In order to support these sales, the store 18 includes an order management system 26 which may include multiple different components as discussed herein.

In one example, the store order management system 26 may include an order management server 34. The order management server 34 may allow customers to place orders with the store 18 and may allow for management of those orders. The order management server 34 may allow a customer to place an order online, and may also allow a customer to review the status of previously placed orders. The order management server 34 may also allow customers to manage a prior order. For example, the order management server 34 may allow a customer to initiate a return of an item on an order, track the status of an order, or perform other tasks related to an order. The order management system 26 may also include an inventory server 42. The inventory server 42 may store inventory information for the store 18. The inventory server 42 may store inventory information for items sold at a brick and mortar store location as well as for items available for purchase from the store online as well as in an online marketplace environment. The inventory server 42 may be used to determine the availability of products for delivery to a store physical location, shipment to a customer, and also for products sold by a third party in an online marketplace environment which is hosted by the store order management system 26. The order management server 34 and inventory management server 42 are associated with a respective order database and an inventory database. One or both of the order management server 34 and the inventory management server 42 may implement the associated database. One or both of the order database and the inventory database may be a sharded database which is implemented with multiple database shards. Such a database may be implemented across multiple database servers which each implement a particular database shard.

Figure 2:
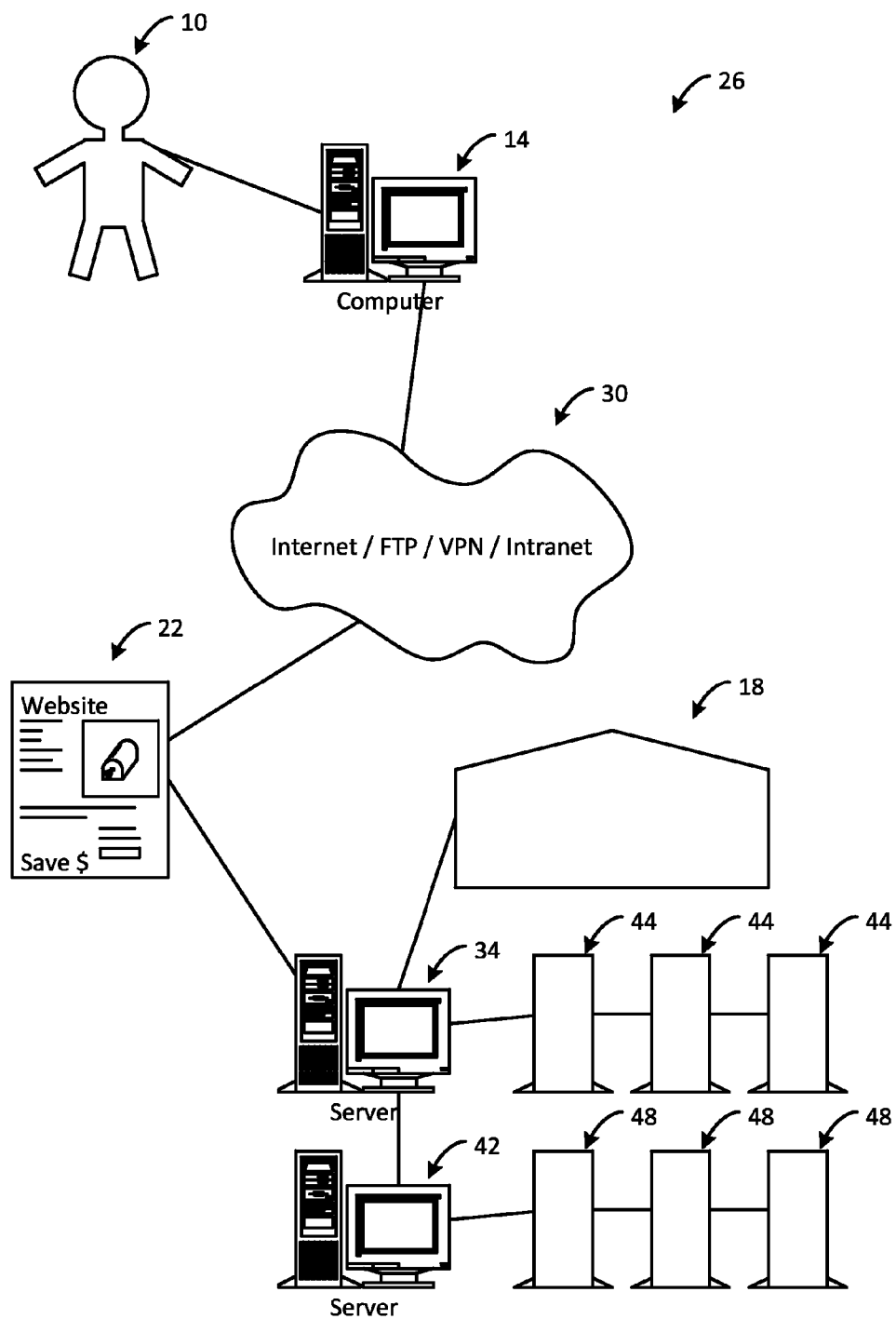
FIGS. 2, 3, and 4 are schematics illustrating additional aspects of the computer system.

FIG. 2 shows additional aspects of the store computer system. A customer 10 may shop at a brick and mortar store location 18. Alternatively, the customer 10 may use a computer 14 to order products from a store website 22 and then pick up the products at the store 18 or have the products delivered to their home. The website 22 may be hosted by a store computer such as the order management system server 34 or another store server. The customer 10 may also order products from a store market place website 22 to have the products delivered to their home. The store marketplace website 22 may be hosted by a store computer such as the order management system server 34 or another computer. The marketplace website often features products for sale which are not available in a brick and mortar store location 18. The marketplace may feature products which are offered for sale by a third party and are sold from a store warehouse, or which are offered for sale by a third party and shipped directly from the third party. The customer computer 14 and the order management system server 34 may be connected and enabled to communicate via the internet 30.

The order management server 34 may implement an order database. The order database may be a sharded database, and may be implemented across multiple order database servers 44. Similarly, the inventory management server 42 may implement an inventory database. The inventory database may be a sharded database and may be implemented across multiple inventory database servers 48.

Figure 3:
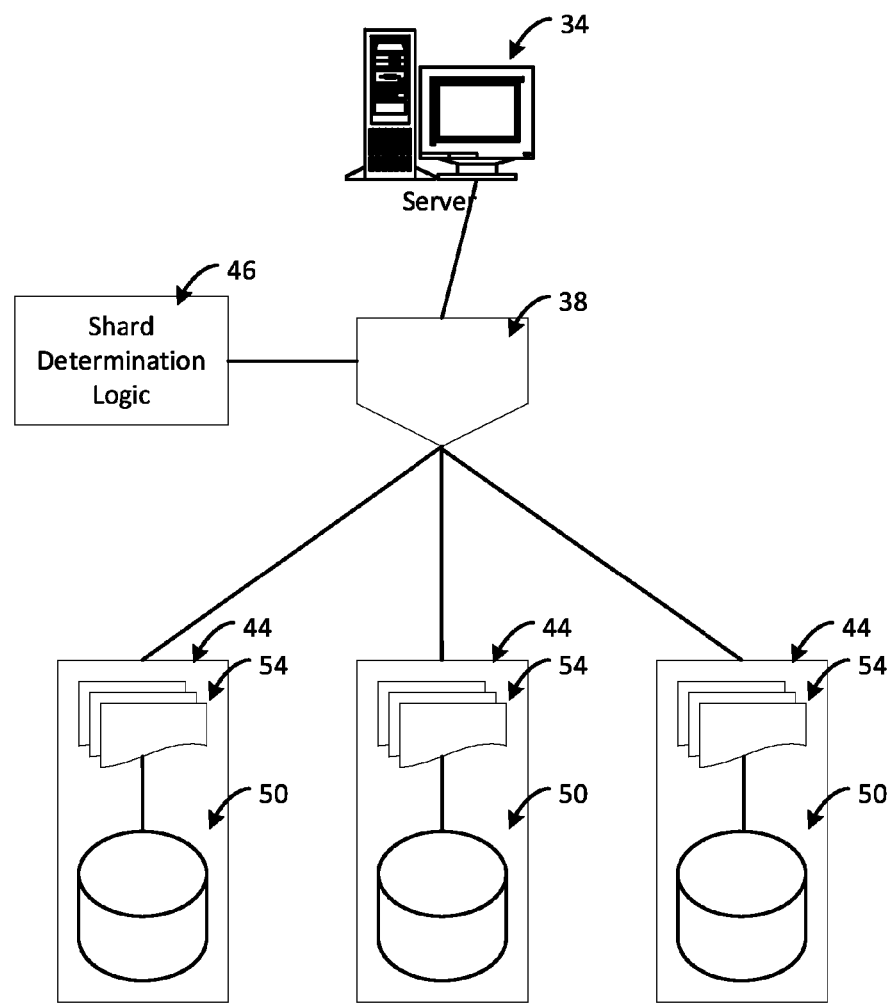

Referring to FIG. 3, a store order management system 26 may include one or more order management servers 34. As discussed, the order management server 34 may host a store website 22 and provide a web portal through which a customer may place an online order with the store 18 or otherwise manage an account with a store 18. In some instances, the customer may be a vender who provides goods to the store and manages orders, returns, etc. as a client of the order management system 26. The order management server 34 may facilitate the collection and presentation of information to a customer 10 in the process of interacting with the customer during shopping experiences. The order management server 34 may communicate with the customer 10 via a customer computer 14 and via the internet 30 or other communication systems. The customer computer 14 may be one of a variety of different electronic devices such as a smart phone, tablet computer, laptop, personal computer, etc. The customer 10 may use a computer 14 to provide information to the order management server 34 and to receive information from the order management server 34 in the context of online shopping and order management with the store 18.

More particularly, the order management server 34 may execute or facilitate the execution of an order database. As such, the order management server 34 may execute additional functions or may be associated with additional equipment to facilitate the implementation of an order database and, in particular, a sharded order database. The order management server 34 may be associated with other computing devices such as a router 38 which controls the flow of information to multiple order database servers 44. Each of the order database servers 44 includes a shard 50 of a larger overall order database. The router 38 includes shard determination logic 46 which is used to determine which database server 44 (i.e. which database shard 50) should be accessed with regards to a particular customer request (i.e. a customer order, order lookup, return, etc.). The shard determination logic 46 may be present on the router 38 in the form of software or firmware. The router 38 may be implemented as a server which is configured to operate as a router or as a dedicated, single-purpose hardware router. In some instances, a single server (e.g. order management server 34) may implement the functionality of both a web server/customer portal and a router.

Each database server 44 includes a database shard 50 which is part of a larger overall database that forms the store order database. Additionally, each database server 44 may include an order management system (OMS) application layer 54. The OMS application is distributed among the different database servers 44 such that each individual database server 44 executes the OMS application. The order management system 26 may thus be sharded at the application level with each database server 44 running an instance of the OMS application software 54. Each database server 44 thus may operate independently in communicating with a particular customer to receive information from the customer and to provide information to the customer.

Figure 4:
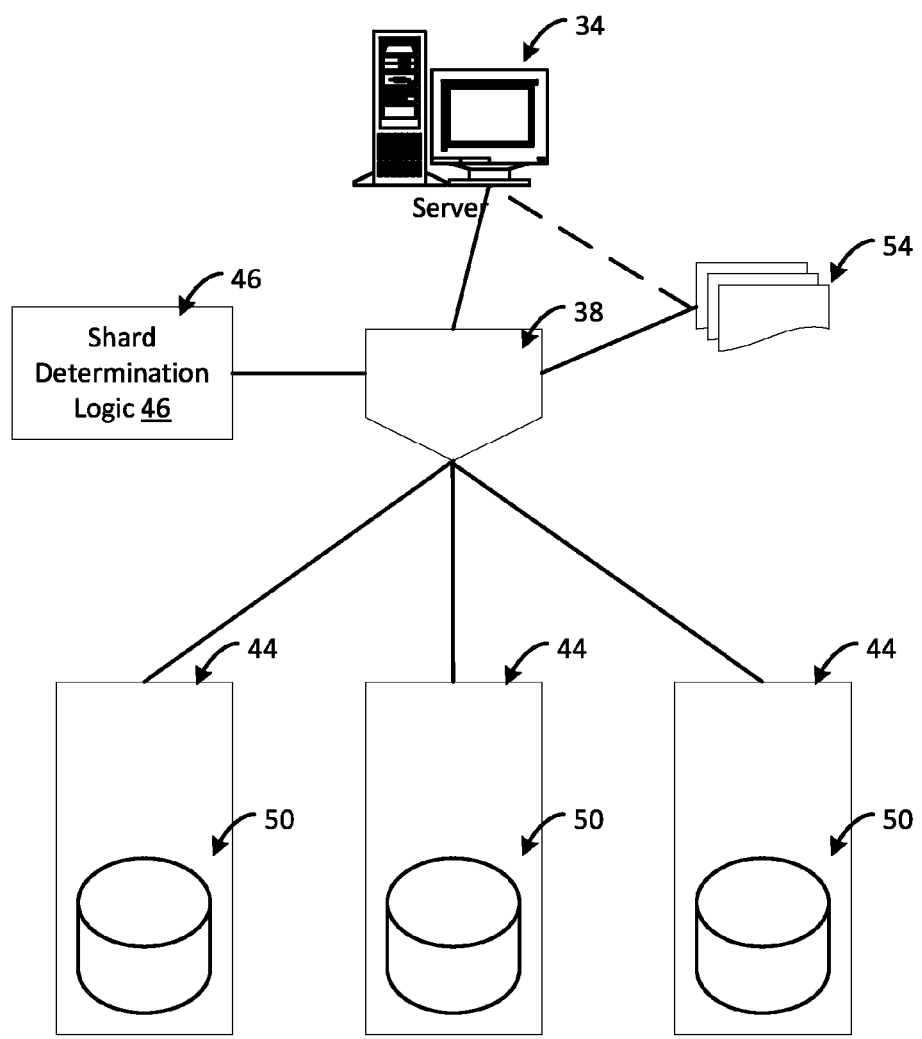

Referring to FIG. 4, an order management system (OMS) application layer 54 may also reside in and be implemented by the order management server 34 (customer portal), may be implemented by a router 38, or may be implemented by a server which performs both the functions of an order management server/customer portal and router. FIG. 4 shows an alternative implementation of the order database and related items shown in FIG. 3. Many of the structures shown in FIG. 4 are the same as those shown in FIG. 3 and are not discussed in detail, but are understood to have the functionality discussed with respect to FIG. 3. The OMS application layer 54 may be implemented at a single location such as the server 34 and, via the router 38, communicates with the different order database servers 42 such that each individual database server 42 provides order data from an individual shard 50 to the router 38 and to the OMS application layer 54/order management server 34.

The router 38 includes shard determination logic 46 which is used to determine which database server 42 (i.e. which database shard 50) should be accessed with regards to a particular customer request. The order management system (OMS) application layer 54 may reside in and be implemented by the web server 34 (customer portal), may be implemented by a router 38, or may be implemented by a server which performs both the functions of a web server/customer portal and router. The OMS application layer 54 is implemented at a single location and, via the router 38, communicates with the different database servers 42 such that each individual database server 42 provides order data from an individual shard 50 to the router 38 and to a customer computer 14. The order management system 26 is thus sharded at the order database level. Each database server 42 includes a database shard 50 which is part of a larger overall database that forms the store order database. Each database server 42 thus may communicate with a particular customer to receive information from the customer and to provide information to the customer.

The customer computer 14 may be used to send and receive order information associated with one or more orders placed with the store 18. The software, hardware, and associated components of a computer system may be programmed and configured to implement one or more embodiments described herein. Customers 10 may communicate with a store web server 34 via a network connection or internet connection, internet 30, and webpage 22 to place orders with the store 18 and to manage orders with the store.

To participate in online or computer assisted shopping with the store, customers 10 may be invited to create an account with the store. Customers 10 who desire a store account will provide customer information such as identifying information, password information, contact information, etc. The store may store customer information in an electronic record associated with the customer 10 in a customer database, such as in server 34. The server 34 may store information regarding the customer 10 and regarding customer preferences in the context of a customer account created by the customer. The server 34 may thus store contact information for the customer 10 (or for the electronic device 14 used by the customer and associated with the customer account). The server 34 may also store customer purchase history and purchase information associated with the customer 10.

The computer 14 (smart phone, tablet computer, laptop, desktop computer, etc.) typically includes a body or case which houses internal electronic s such as a processor, storage, memory, battery, communications device, etc. The computer 14 includes a user interface such as screen, keyboard, mouse, etc. The various components of the computer 14 allow the computer 14 to perform the functions and display the data discussed herein.

The customer 10 may use the computer 14 to transmit order information to the server 10. The customer may log into a customer account via a store webpage 22 in order to place or manage an order. In placing an order, the customer may select items for purchase, select a shipping method and destination, and pay for the order. The customer may also manage orders. The customer may enter an order number or otherwise select an order which they have placed in the past and may perform subsequent tasks with that order. The customer may view order status to determine if the order has shipped, view delivery status, initiate a return for an item on the order, etc. The customer may perform these tasks via the computer 14 and via the webpage 22 and web server 34. The customer 10 may also receive information from the store via the computer 14.

The order management system 26 may receive information from the customer computer 14 and may provide information to the customer computer 14. In providing a system 26 which utilizes an OMS application 54 and a sharded database 50, the system 26 functions in a way which is transparent to the customer 10.

The server 34 may provide a communications portal with the customer as it receives information from and provides information to the customer 10 via an internet browser or the like. The server 34 (or a router 38) implements an OMS application layer 54. Alternatively, the OMS application layer 54 may be sharded and implemented by the order database servers 42. The OMS application layer 54 may include software, firmware, etc. which allows customers to place orders, retrieve orders, view orders, manage orders, create and manage returns, etc. The OMS application layer 54 may include software which manages or directs the router 38 and which otherwise facilitates the flow of information to and from the database shards 50. The router 38 routes information to and from an appropriate database server 42 which is housing a shard 50 of the overall store order database.

The router 38 includes shard determination logic 46 in the form of software or firmware to determine which shard (and thus which database server 42) should transmit/receive information in communicating with the customer. The use of a router 38 with shard determination logic 46 keeps the shard determination logic outside the database boundary. Maintaining the shard determination logic outside of the database ensures that the processing of orders is not impacted by system maintenance, although the maintenance will be challenging, as it has to co-exist with the complexity of logical separation of orders.

Customer requests will be intercepted by a routing layer 38, which will determine the appropriate shard 50 using the data in the customer request. Shard determination logic 46 is responsible for the reliability of the identification. One of the advantages of such mechanism is the ability to horizontally scale the complete database (shards 50) underneath an OMS application layer 54 to support the load and volume of a particular retailer. One particular challenge is to maintain the consistency of services offered by each of the shards 50. Any post production fixes and updates to the database will need to be managed well to make sure that each of these shards are reflecting the same version of fix or code. One of the performance benefits of this mechanism is that it improves the reads and writes in a specific application exponentially. The only additional overhead injected by the system 26 is that the read or write for a particular customer request will need to go through the shard determination logic 46. It is thus advantageous to keep the shard determination logic 46 light so that individual read and write transactions are faster.

The shard determination logic 46 may use different shard determination methods. For new orders, a random determination method may provide that every order is randomly routed to each of the shards 50. In the context of a sharded order database, a concern is that each shard 50 is similarly utilized in having similar used storage amounts and similar available capacities. Statistically, a random shard determination for new orders will tend to average the shard usage as orders become randomly distributed among different shards 50. A round robin (e.g. dynamic or weighted) shard determination may provide that every order is distributed round robin fashion into the shards 50 such that a first order goes to the first shard, the second order goes to the second shard and so on. A modulo determination provides that the determination of the shard for an order is done by modulo operation on the sequence of the order. The result of $(a-(n*int(a/n)))$ may be used as the shard number for an order n. A predictive/logical shard determination method may be used whereby the data within an order is used by the shard determination logic 46 to select the shard 50. For example all orders from California goes to shard one or all store order goes to shard two etc.

As a customer 10 may have on order history with many different existing or past orders, different existing orders pertaining to a single customer may be located in different database shards 50 and thus different database servers 42. A server 34 may store customer accounts which include order information. Each order may be identified by an order identification number. The order may also include information to identify a database shard 50 on which that particular order may be stored. Such shard identifying information may be a data field associated with an order, or may be part of the order identification number itself; such as being an alphanumeric digit which is part of the order number, such as the first digit (or another predetermined digit) in the order number. A customer 10 may select an order in a customer account and the router 38 may determine which database shard 50 is associated with the selected order.

Selected order information for existing customer orders may be stored in an order identification database on the order management server 34. Such an order identification database need not include all of the order information (e.g. order status and history, products, etc.) but may include select identification data such as customer identification, order number, database shard, etc. This may allow an order management server 34 to quickly request order information from the order database shards 50 in presenting customer account and order information to a customer. Data found in this order identification database may be used by the shard determination logic 46 to quickly identify a shard 50 which pertains to an order associated with a customer request to manage the order. Thus, a small order identification database or cache may be used by the order management server 34 to facilitate the use of customer accounts and order history. The order management system 26 may draw order information from multiple database shards 50 while providing information to a customer.

Figure 5:
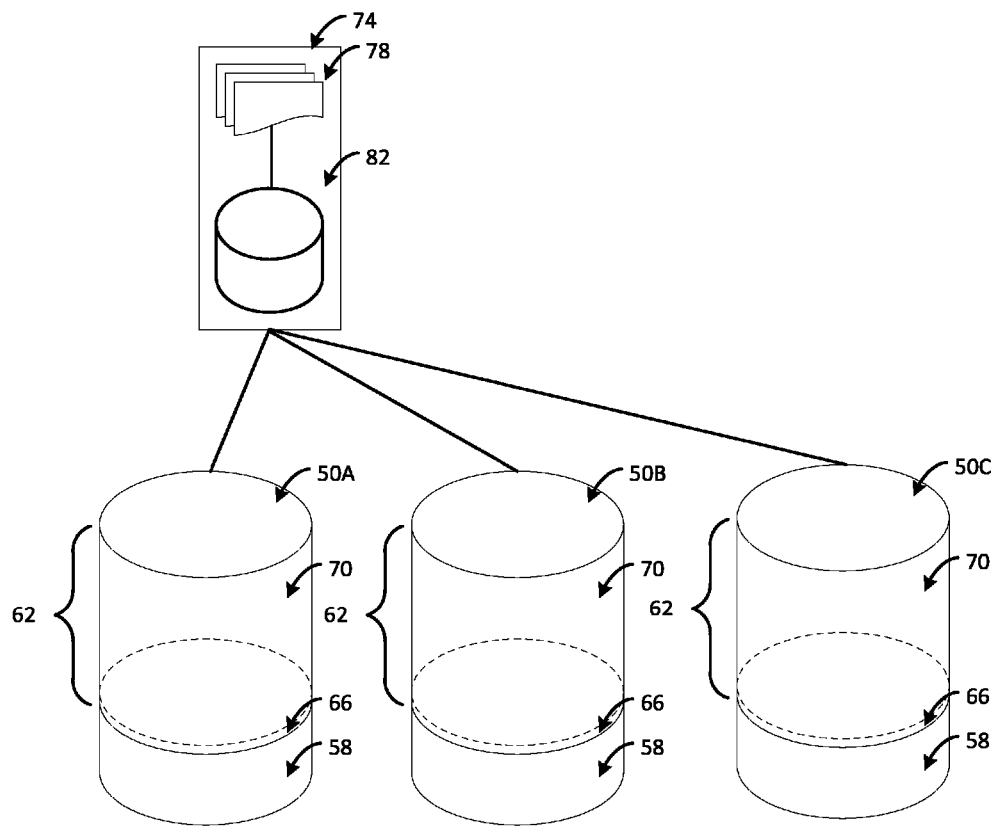
FIGS. 5, 6, and 7 are schematics illustrating various aspects of database shards forming part of the computer system.

Referring now to FIG. 5, database shards may be managed to reduce the load on the router 38 and the shard determination layer 46 to thereby promote a system which does not have a heavy overhead or unnecessarily affect the speed of communications between a customer computer 14 and a database shard 50. FIG. 5 shows three database shards 50A, 50B, 50C in an order management system 26. (These database shards 50A, 50B, 50C are exemplary of database shards 50 in the preceding figures) Each database shard 50 is typically implemented among an array of hard drives on a database server 42 (e.g. a RAID array). Each database shard 50 includes a used portion 58, and an unused portion 62 representing available capacity in the shard. The unused portion 62 of the shard 50 includes a buffer capacity 66 which is necessary for the shard to perform read, write, and buffering operations during normal operation of the database server 42. The unused portion 66 of the shard 50 includes an available storage capacity 70 which has a storage capacity equal to the unused shard capacity 62 minus the buffer capacity 66.

In operation, the router 38 and shard determination logic 46 will distribute customer order data among the shards 50 so that the shards 50 have similar used capacities 58 and unused capacities 62 as discussed above. The shard key may have a shard number (such as SH-1) which avoids the use of lookup tables or other more complex manners of the shard determination logic 46 determining a particular shard 50. In this manner, the router 38 and shard determination logic 46 operate with minimal intrusion into the communication between customer computer 14 and database server 42.

The order management system (such as an individual database server 42) may monitor the order data stored on each shard 50. As past orders get older, they will reach an age where items from an order are no longer returnable. Orders which are no longer returnable typically no longer have a need to be modified. When an order is no longer returnable, a database server 42 may transmit the order data to an archive server 74 (which may include an order management archive application layer 78 and database storage 82) and the archive server 74 may store the order information. The database server 42 may then delete the order information from the shard 50. This will maintain the size of the used data 58 on the database shard 50 to a steady state quantity of data and remove old order data from the active OMS sharded database. The steady state amount of used data 58 on a shard 50 will be approximately equal to the average data size of an order record multiplied by the average number of orders per day and the number of days until an order is not returnable and divided by the number of shards 50. The size of the used data 58 on a shard 50 will thus grow with current order volume rather than with past order quantity. Additionally, the above calculation may be used to determine a target number of shards 50 in an order database. The target number of shards 50 would be the average data size of an order record multiplied by the average number of orders per day and the number of days until an order is not returnable and divided by the target steady state amount of used data 58 on an individual database shard 50.

As order volume grows, the used data 58 on a shard 50 will grow and the available capacity 62 on the shard 50 will diminish. The order management system 26 may monitor the available capacity 62 on the shards 50. This may be performed by the database servers 42. A threshold of necessary available capacity 70 may be set, such as capacity to store 180 days of new orders. When the available capacity 62 is greater than the necessary capacity 70 for 180 days of operation plus the necessary buffer capacity 66 the shard 50 is operating with sufficient storage capacity. When the available capacity 62 is reduced to where the available capacity is equal to or less than the necessary storage capacity 70 for 180 days of operation (i.e. the threshold) plus the buffering capacity 66, the database server 42 or order management system 26 may signal that it is necessary to add an additional database server 42 and database shard 50.

Figure 6:
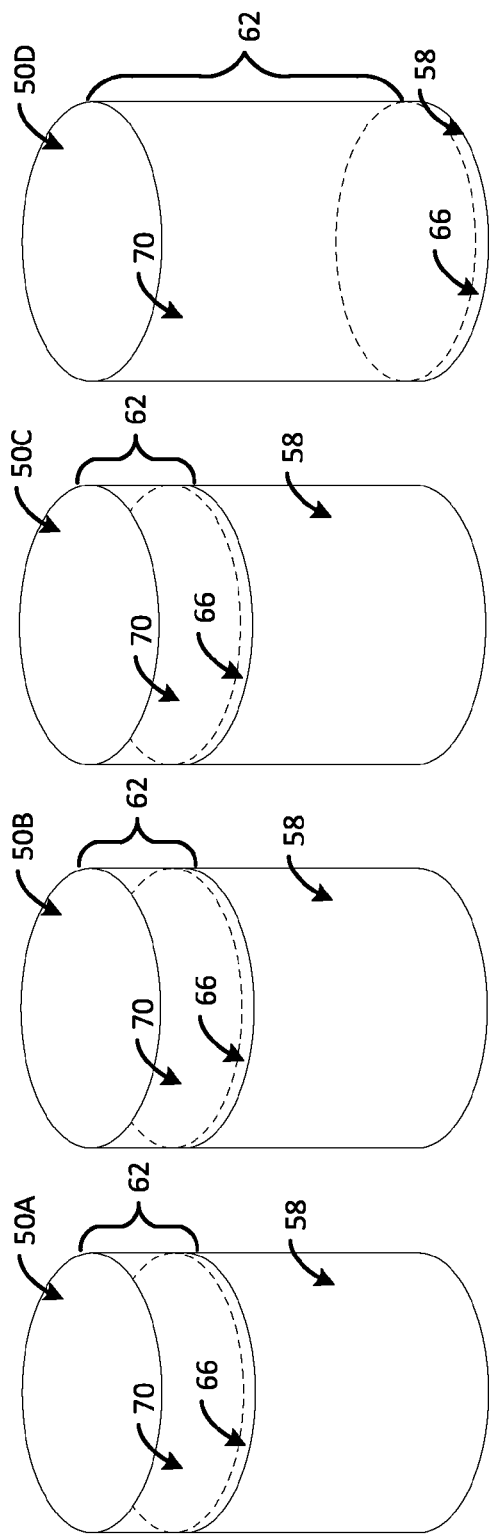

Referring now to FIG. 6, a new shard 50D may be added to the system 26 when the system signals that it is necessary to add a new shard. The new shard 50D will be empty, and may be added as part of a new database server 42 with includes the shard 50 and OMS application layer 54 (if this is also sharded). Once a new shard 50D is added to the system 26, the shard determination logic 46 is modified to address the new shard 50D along with the existing shards 50A, 50B, 50C. The router 38 and shard determination logic 46 will thus distribute new orders among all shards 50. The old shards 50A, 50B, 50C will thus receive a reduced amount of orders (approximately equal to N/(N+1) where N is the old number of shards) due to the presence of the new shard. This will thus reduce the necessary order capacity 70 and allow the shards 50 to operate at an acceptable capacity level without moving any data from the shard 50. Additionally, the used capacity 58 on an old shard 50A, 50B, 50C will naturally diminish and the available capacity 62 will increase as older orders are archived to the archive server 74.

Figure 7:
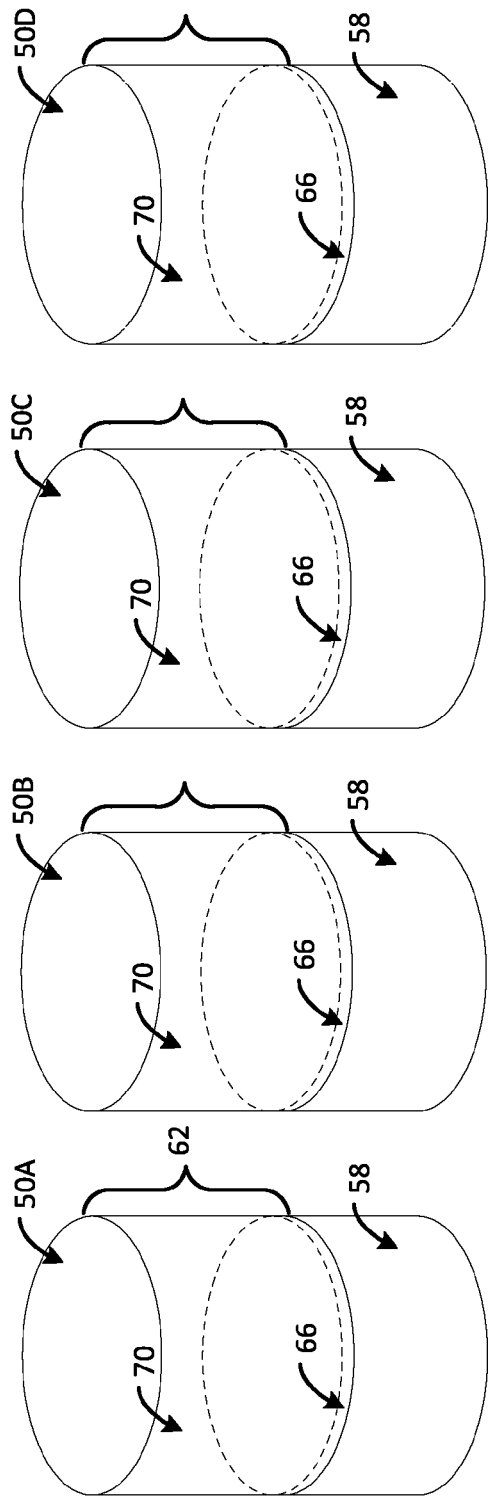

Thus, the used capacity 58 on an old shard 50A, 50B, 50C will be reduced to a new steady state level (reflecting the current order volume and the current number of shards 50 with the new shard 50D) after a period of time approximately equal to the time period for archiving old orders to the archive server 74 (i.e. the time period after which orders cannot be returned). In this manner, the old shards 50A, 50B, 50C are naturally brought back down below their maximum used capacity/minimum free space threshold and there is no need to transfer order data between shards to balance the system. After a time period equal to the archiving time threshold for old orders, each shard 50 in the system 26 will be balanced. FIG. 7 shows such a state where each shard 50A, 50B, 50C, 50D is balanced. The shard determination logic 46 need not be modified to balance the storage capacity and load on the individual shards 50 as this may occur naturally.

This system 26 significantly improves performance. Since active order data is never moved between shards, the shard determination logic 46 does not need excessive complexity to track/determine order data and the sharded database does not increase the time for communications between a customer computer 14 and a database server 42 or archive server 74. The shard determination logic 46 may route new orders between shards 50. Order information may itself indicate a database shard (such as by using a shard number as a particular digit in the order number or placing the shard number in a data field associated with the order) and old orders (orders over a predetermine time period such as the time period for return) may be automatically moved to an archive server 74 and the shard determination logic may automatically determine that an old order is in the archive server 74 by date or the shard identification data associated with the order may be modified at this point.

Figure 8:
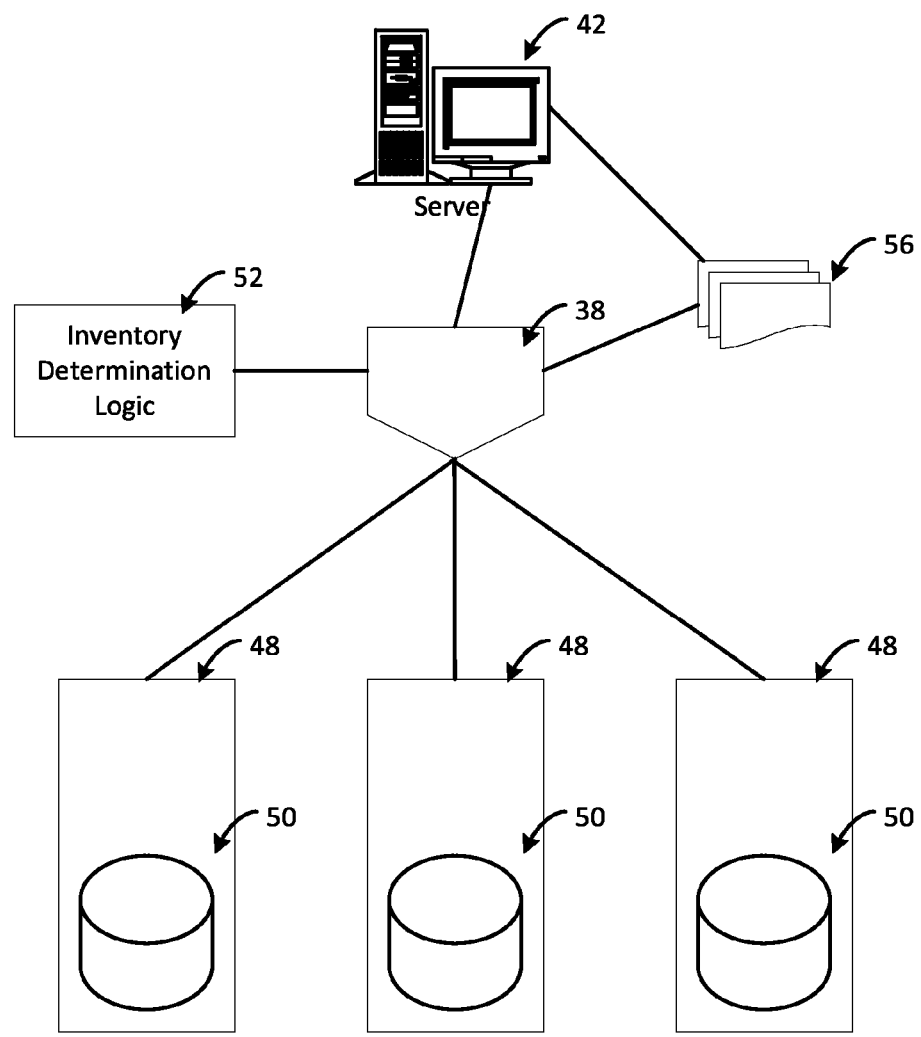
FIGS. 8 and 9 are schematics illustrating additional aspects of the computer system.

Referring now to FIG. 8, a store order management system 26 may include a sharded inventory database. A conventional inventory database includes a single database in order to maintain the reliability of the inventory. In some situations, however, a conventional inventory database is not capable of handling demands such as providing real time inventory for online ordering with massive sales volume. As such, a conventional inventory database may be replaced by an array of inventory servers 48 which each host shards 50 of a sharded inventory database. For example, Walmart.com receives a significant amount of customer traffic during regular parts of the year. This customer traffic may include customers placing orders as well as customers later checking on order status, performing a return, etc. During holidays such as Christmas Walmart.com may receive upwards of 10,000 orders per minute for sustained periods of time. This high amount of customer orders cannot be sustained by a conventional store inventory database. As order volume grows exponentially, heavy database contentions, long DB lock times, slow inventory supply processing, slower inventory reservations, slower inventory availability calls, and slower order processing plague a traditional inventory database.

A store order management system 26 may include an inventory server 42. The inventory server 42 may communicate with an order management server 34 and thereby provide inventory information to a store website 22 or other portal through which a customer may place an online order with the store 18, store marketplace, or otherwise manage orders with a store 18. In some instances, the customer (client) may be a vendor who provides goods to the store and manages orders, returns, etc. as a client of the order management system 26. The order management server 34 may facilitate the collection and presentation of information to a client or customer 10 in combination with the inventory server 42.

The inventory data is provided to the order management server 34 in response to a customer, via a computer 14 and the internet 30, viewing items for sale on a website 22. The inventory data is used by the order management system 26 to provide accurate order information to the order management system 26 so that the order management system can provide this information to a customer during the order process. This allows the customer to verify availability of an item before purchasing the item. The customer may verify that the item is available for pickup at a particular store location or is available to be shipped to their home. As orders are placed by customers, the inventory data may be modified by the order management system to reflect that particular items are no longer available and the order management system may indicate that particular items from inventory are to be pulled from inventory for customer pickup or for shipping to a customer.

The inventory server 42 may communicate with a router 38 which controls the flow of information to multiple inventory database servers 48. Each of the multiple inventory database servers 48 includes a shard 50 of a larger overall inventory database. The router 38 includes inventory shard determination logic 52 which is used to determine which inventory database server 48 (i.e. which inventory database shard 50) should be accessed with regards to a particular customer request (i.e. a customer order, order lookup, return, etc.). The shard determination logic 52 may be present on the router 38 in the form of software or firmware. The router 38 may be implemented as a server which is configured to operate as a router or as a dedicated, single-purpose hardware router. In some instances, a single server 42 may implement the functionality of an inventory management server and a router for the inventory database servers 48 and shards 50.

The order management system 26 may include an inventory management system (IMS) application layer 56. The IMS application layer 56 may be implemented in the router 38. In some examples, the IMS application layer 56 may be implemented in the inventory server 42. The router 38 may be an inventory system router which is particularly associated with the inventory database servers 48 to direct traffic to and from the various inventory database shards 50. The IMS application layer 56 is not sharded so that the IMS application layer has visibility across the inventory database shards 50 and so that the IMS application layer is able to perform some of the inventory maintenance services.

The order management system 26 is thus sharded at the inventory database level. Each database server 48 includes a database shard 50 which is part of a larger overall database that forms the store inventory database. Each database server 48 thus may communicate with the order management system 26 (e.g. the IMS application layer 56/inventory management server 42 and OMS application layer 54/order management server 34) to receive requests and information from the system 26 and to provide information to the system 26.

The customer 10 may use the computer 14 to transmit order information to the store, particularly in the context of placing an order. The customer may log into a customer account at a store webpage 22 in order to place or manage an order. In placing an order, the customer may select items for purchase, select a shipping method and destination, and pay for the order. In placing an order, one or more of the inventory database servers 48 may transmit inventory data to the customer computer 14. Particularly, the inventory data may indicate which items are available for purchase, which items are available for shipment to the customer's house, where the items may ship from, which items are available for store pickup at a selected brick and mortar store location, etc. This information assists the customer in making a purchasing decision.

The order management system 26 may receive information from the customer computer 14 and may provide information to the customer computer 14. Customer queries may be handles by the OMS application layer 54, IMS application layer 56, and/or router 38. The router 38 uses inventory shard determination logic 52 to route information to and from an appropriate inventory database server 48 which is housing a shard 50 of the overall store inventory database. The router 38 includes shard determination logic 52 in the form of software or firmware to determine which shard 50 (and thus which database server 48) should transmit/receive information in communicating with the customer and in communicating with the other aspects of the order management system 26. The use of a router 38 with shard determination logic 52 keeps the shard determination logic outside the database boundary. Maintaining an IMS application layer 56 and sharding logic 52 outside of the database boundary are aspects of implementation that ensures that the inventory is reliable and that the IMS application layer has visibility across the inventory database.

Inventory requests will always be intercepted by a routing layer 38, which will determine the appropriate shard 50 according to the shard determination logic 52. Shard determination logic 52 is responsible for the reliability of the identification of the database shard and may be responsible for identification of a database shard 50 for items going into and out of inventory. One of the advantages of such mechanism is the ability to horizontally scale the complete database (shards 50) underneath an IMS application layer 56 to support the load and volume of a particular retailer. Additionally, this allows for logical separation of the inventory database according to the nature of the database.

Various different parameters may be considered in determining how to shard an inventory database (and thus the inventory shard determination logic 52). The nature of the store 18 may determine the nature of the inventory database sharding to some degree. In one example, a store 18 may operate with one or more brick and mortar store locations. In another example, a store may operate with an online store. In another example, a store may operate with brick and mortar locations in addition to an online storefront. In another example, a store may operate with brick and mortar locations, an online storefront, and an online marketplace. These different business models may advantageously utilize different models of inventory database sharding.

Separated or sharded inventory or a separated or sharded database refer to placement of data regarding particular items of inventory or a particular portion of an inventory database on a particular database shard 50, typically operated by a particular inventory database server 48. Separation or sharding of a particular type of item or a particular type of inventory refers to placement of inventory data associated with that type of item or that type of inventory on a particular database shard 50.

An inventory database may be sharded by separating the inventory data according to a catalog/item designation. For example, all items sold by Marketplace vendors may be stored in a different shard, or all electronics media may be stored in a separate shard and so on. In this implementation of sharding, inventory may be separated by category; e.g. inventory for all market place items is put into the corresponding shard or inventory for all electronics media go into a the respective shard. Thus, different types of products may be separated and stored on different inventory database shards 50. A hierarchical category tree may be made for inventory and this organizational structure may be used to determine sharding of the inventory database. Thus, food and grocery items may be stored in one database shard while household items may be stored in a different database shard. Any particular seller/distributor specific item will reside in a given inventory database shard. Since most of the requests from consumers/producers have seller information and/or the item-inventory information, this information can be used to identify the database shard associated with the particular item. Similarly, when a customer searches online for a particular item on a store website 22, the search will typically designate a particular type of item and the search information would thus provide the information necessary for the shard determination logic to identify the database shard where information regarding the desired items is stored. This type of database sharding can be utilized to eliminate usual giant inventory database problems.

In another implementation of inventory database sharding, inventory database information may be separated by type of inventory. This may be particularly useful for a store 18 which provides different venues of sales, such as brick and mortar store locations, online sales, and online marketplace sales. In this example, the segregation of inventory data may be done based on the sales venue; for example store inventory vs online inventory vs marketplace inventory, or store owned inventory vs seller owned inventory.

In another implementation of inventory database sharding, inventory database information may be separated by operations which are performed by a consumer or producer. Based on the consumer/producer operations, inventory database traffic could be distributed to a specific shard. For example, all the inventory data for products with online purchase availability and reservation may be separated and stored on a specific database shard 50, regardless of whether the product is also available in a brick and mortar store location. This type of separation can be advantageous as the online inventory database service level agreement (SLA) is very high.

Additionally, inventory database data may be sharded based on a combination of any of the above approaches. In some instances, faster responses may be achieved by segregating inventory by combination of above approaches; such as by operation and seller inventory or by seller item and operation. Thus, all inventory data for products which may be purchased online may be separated from the in-store-only inventory and the online inventory may be further separated by online vs marketplace inventory, or by store owned or seller owned inventory. Each of these separated groups of inventory database information would be stored on a corresponding database shard 50.

The determination of which inventory data will be placed on which inventory database shard 50 will then be reflected in the inventory shard determination logic 52 to allow the router 38 to properly route information to and from database shards 50. Additionally, the determination of inventory data sharding may then be reflected in the order management system and, in particular, in a store webpage 22. The store webpage 22 may use product categories or a product hierarchy which reflects the shard determination logic 52. A store webpage search engine may also reflect the shard determination logic 52.

Thus, a combination shard determination logic may be used which shards inventory data according to: TYPE OF GOODS—IN-STORE/ONLINE—BY SELLER. The store webpage 22 may then use these same product attributes (TYPE OF GOODS—IN-STORE/ONLINE—SELLER) associated with each product and may use these attributes as part of a product hierarchy in separating goods into classes. The data for each particular item may have the relevant attributes associated therewith as data fields. As a customer selects items on a webpage, they may select a type of goods, a desired location of purchase, and then a desired seller (by virtue of selecting a particular item). The customer may thus select each of the necessary items of data for the shard determination logic 52 to identify a database shard 50 in the process of selecting items for purchase. Thus, a customer query or customer selected information from the webpage 22 may have all necessary information to transmit to the router 38 and identify the relevant inventory database shards 50 which contain inventory information for the customer query.

One of the performance benefits of this mechanism is that it improves the reads and writes in a specific application exponentially. The only additional overhead injected by the system 26 is that the read or write for a particular customer request will need to go through the shard determination logic 46. It is thus advantageous to keep the shard determination logic 46 light. The order management system 26 may draw inventory information from multiple database shards 50 while providing information to a customer 10 or the store 18 in the context of presenting available items for sale, completing sales, filling orders, maintaining inventory, etc.

Figure 9:
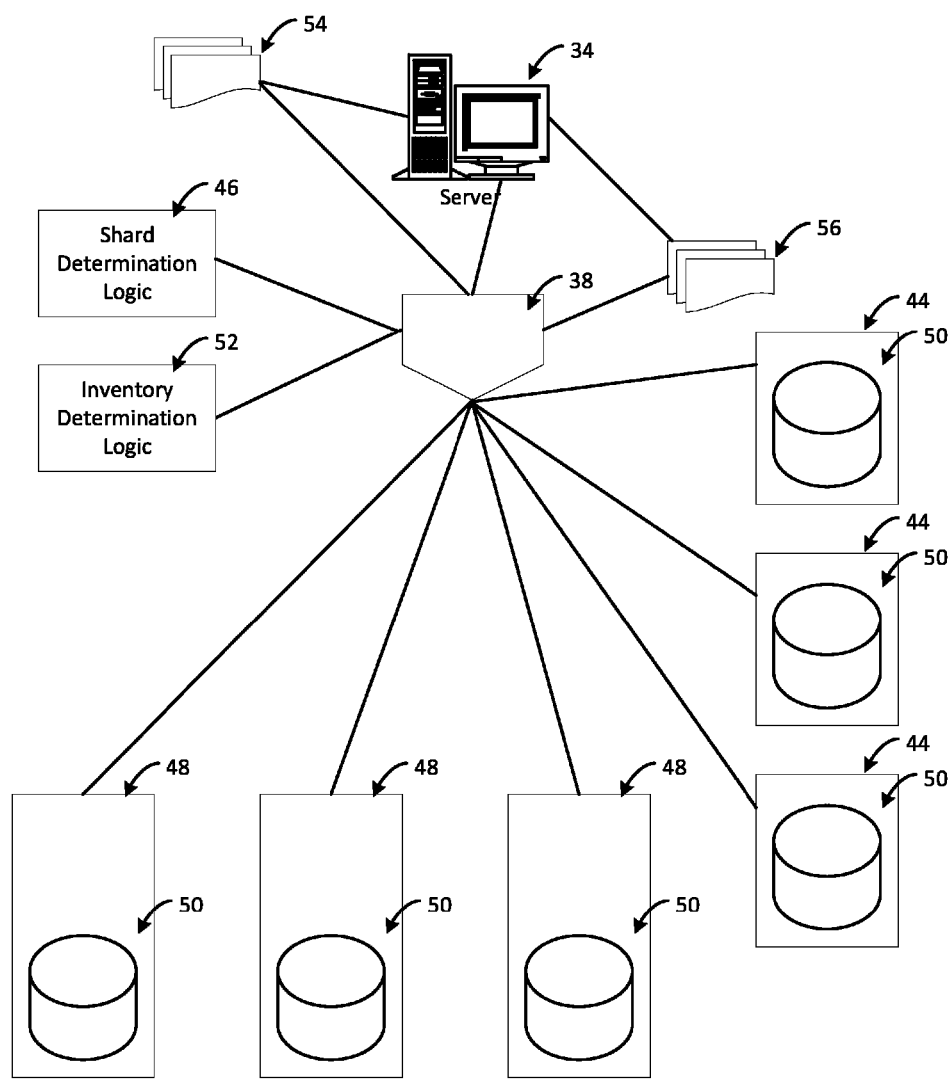

Referring now to FIG. 9, an order management system 26 may utilize the order management server 34 to manage inventory database servers 48 and inventory database shards 50. An order management system (OMS) application layer 54 may reside in and be implemented by the order management server 34 (customer portal), may be implemented by a router 38, or may be implemented by a server which performs both the functions of an order management server/customer portal and router. Similarly, the inventory management system (IMS) application layer 56 may be implemented by the order management server 34/router 38. The OMS application layer 54 and IMS application layer 56 may be implemented at a single location such as the server 34 and, via the router 38, the system 26 may communicate with the different order database servers 44 and inventory database servers 48 such that each individual database server provides order or inventory data from an individual shard 50 to the router 38 and to the OMS application layer 54/IMS application layer 56/order management server 34. The order management system 26 may function as is described with respect to the other figures except that the OMS application layer 54 and IMS application layers may be implemented on a server 34 and the order shard determination logic 46 and inventory shard determination logic 52 may be implemented on a router 38.

Figure 10:
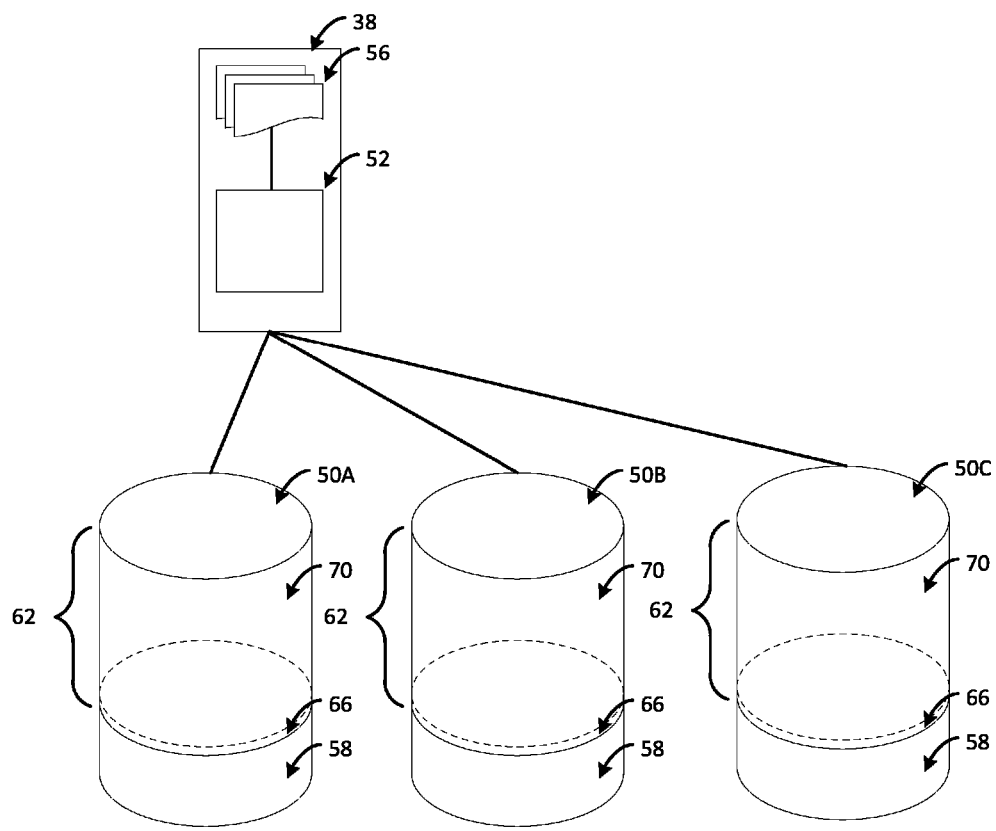
FIGS. 10, 11, and 12 are schematics illustrating various aspects of database shards forming part of the computer system.

Referring now to FIG. 10, inventory database shards 50 may be managed to improve the reliability and speed of the inventory database. The inventory database is typically managed by a computer which is associated with the inventory database. As such, the inventory server 42 or the router 38 may mange the inventory database. In the present example, the router 38 is described as managing the inventory database. The router may thus implement the IMS application layer 56 and the shard determination layer 52 in a manner which does not have a heavy overhead or unnecessarily affect the speed of communications with the inventory server 42 and other computers which form part of the order management system 26.

FIG. 10 shows three database shards 50A, 50B, 50C in an inventory database. Each database shard 50 is typically implemented among an array of hard drives on a database server 48. Each database shard 50 includes a used portion 58, and an unused portion 62 representing available capacity in the shard. The unused portion 62 of the shard 50 includes a buffer capacity 66 which is necessary for the shard to perform read, write, and buffering operations during normal operation of the database server 42. The unused portion 66 of the shard 50 includes an available storage capacity 70 which has a storage capacity equal to the unused shard capacity 62 minus the buffer capacity 66.

Typically, the number of shards 50 which are used in the inventory database is determined by balancing the size and data bandwidth of the inventory (related to the number of products offered and sales volume) with the nature of the store and inventory. Thus, a shard 50A may be dedicated to items which are sold in a brick and mortar store, a shard 50B may be dedicated to items which are sold in an online store, and a shard 50C may be dedicated to items which are sold in an online marketplace by third party sellers.

In operation, the router 38 will work with the IMS application layer 56 and the shard determination logic 52 to appropriately distribute inventory data among the shards 50. In one example, the shard determination logic 52 (representative of the logic of separation of inventory into different parts) may operate so that the shards 50 have similar used capacities 58 and unused capacities 62. The number of shards 50 may be adjusted in performing system maintenance to help achieve this balance. For example, as online marketplace sales and inventory grow, an additional shard 50 may be added to the inventory database and allocated among the shard determination logic to store inventory data for the online marketplace inventory so that the load on the online marketplace inventory database servers 48 remains within a desired range.

A shard key may have a shard number (such as SH-1 or 1BA) which avoids the use of lookup tables or other more complex manners of the shard determination logic 52 identifying a particular shard 50. In this manner, the router 38 and shard determination logic 52 operate with minimal intrusion into the communication with the inventory database server 48.

The shard determination logic 52 thus indicates how different inventory data is allocated among different inventory database shards 50. In one example, the shard determination logic may, in part, contain the following data:

Shard 50A—inventory of items for sale in store
Shard 50B—inventory of items for sale online: Electronics
Shard 50C—inventory of items for sale online: All other
Shard 50D—inventory of items for sale in online marketplace: Sellers A through M
Shard 50E—inventory of items for sale in online marketplace: Sellers N through Z The IMS application layer 56 and the data associated with particular items may assist in implementing the shard determination logic 52 and in operating the inventory database shards 50. The IMS application layer 56 may comprise software for the operation and management of the inventory database. Thus, the IMS application layer 56 may govern the reading of inventory data from the inventory database shards 50, the writing of data to the inventory database shards 50, the modification of data in the inventory database shards 50, etc.

As items are added to the store inventory, a corresponding data entry is created or modified within the order management system 26. The data entry will contain various different data fields relevant to the sale of the item. Data fields may include item name, UPC code, price, description, etc. More relevant to the management of an inventory database, the data entry may include data fields such as where the item is sold (e.g. in store only), the category and type of the item (e.g. housewares; towels), the seller of the item, and the owner of the inventory. These data fields may also include the quantity of the item which are available for purchase and the location of these items. These data fields correspond to decisions which have been made in determining how to separate the inventory data among different database shards 50, and thus correspond to rules within the database determination logic 52. These data fields also provide information necessary to the store 18 to sell the item to customers and to allow for different types of sales such as store pickup of an item purchased online.

If an item is new in the store inventory, a data entry may be created for that item with the necessary data added to the various data fields. If an item is already in the store inventory, the data fields (such as price, quantity and location) may be updated as new inventory is received or as conditions surrounding the sale of this item change. The IMS application layer 56 may facilitate the creation of these data entries and the writing of this data in a database shard 50 for storage As inventory from a brick and mortar location is sold, the computer point of sale system may communicate with the IMS application layer 56 so that the inventory is updated to reflect the actual inventory. As a customer searches for items to purchase online, the customer search query will contain the information necessary to identify the database shard 50 which contains inventory/product information regarding the products which may be purchased.

For example, a customer may search for movies. As determined by the shard determination logic 52, inventory information for movies is stored in database shard 50B. The inventory database shard 50B may thus provide inventory information regarding the different available movies to the order management system 26 and this information is presented to the customer. The customer may select a movie for purchase, and may view the available delivery options. The customer may be presented with information that it is available for shipment to their home and that the movie may also be picked up at a local store. Upon completion of the sales transaction, the inventory may be updated. The shard determination logic 52 may thus be very light and, although it is inserted into every inventory query, it does not cause a delay in transmitting inventory information.

The IMS application layer 56 thus manages the creation and modification of inventory data within the inventory database shards 50 while the shard determination logic 52 provides the decision key which identifies which shard contains which inventory information consistent with the logical separation of inventory into different groups.

The order management system 26 (such as an individual database server 48 or the IMS application layer 56) may monitor the inventory data stored on each shard 50. As items are no longer sold and are removed from inventory from the store, the IMS application layer 56 and database server 48 may delete the item information from the inventory database shard 50. If desired, information regarding an item may be stored in an archive server. This will maintain the size of the used data 58 on the inventory database shards 50 to a steady state quantity of inventory data representative of the current store inventory and remove old inventory data from the active sharded inventory database. The size of the used data 58 on a shard 50 will thus grow with the current inventory/number of different items for sale.

The inventory database size will typically grow as additional items are added to inventory and the used data 58 on a shard 50 will grow and the available capacity 62 on the shard 50 will diminish. The order management system 26/IMS application layer 56 will monitor the available capacity 62 on the shards 50. This may be performed by the database servers 48. A threshold of necessary available capacity 70 may be set for proper operation of the database server 42 and database shroud 50. When the available capacity 62 is greater than the threshold of necessary capacity 70 plus the necessary buffer capacity 66, the shard 50 is operating with sufficient storage capacity. When the available capacity 62 is reduced to where the available capacity is equal to or less than the threshold storage capacity 70 plus the buffering capacity 66, the database server 48 or IMS application layer 56/order management system 26 may signal that it is necessary to add an additional database server 48 and database shard 50 to reduce the load on a particular database shard 50.

Figure 11:
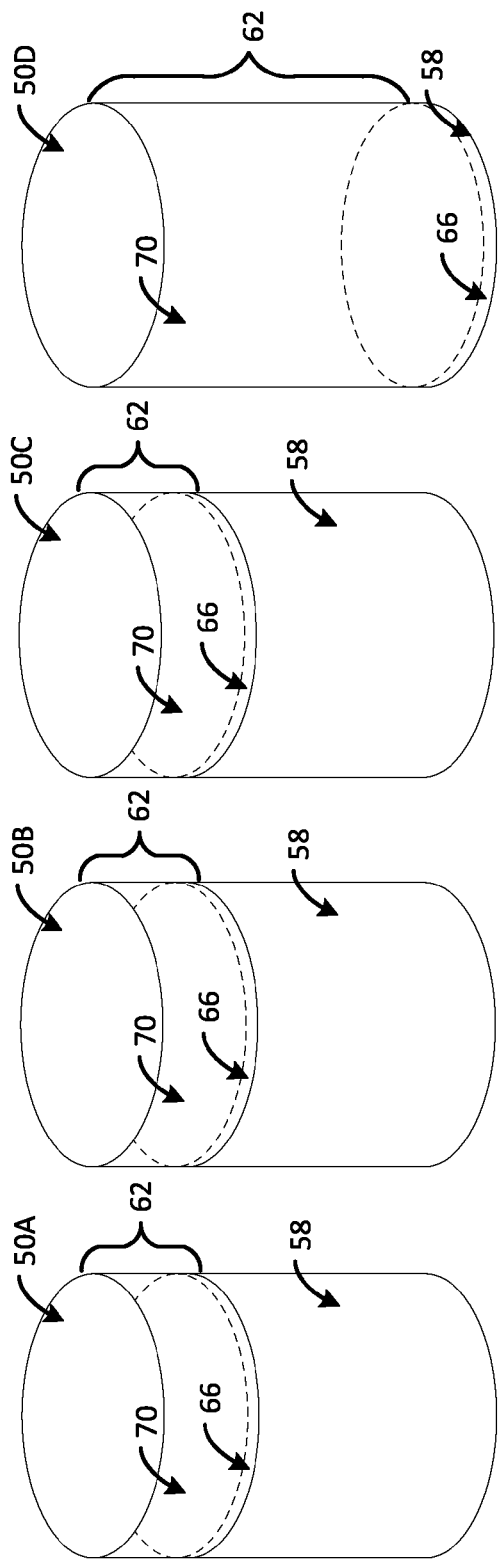

Referring now to FIG. 11, a new shard 50D may thus be added to the system 26 (referring to a system which included shards 50A, 50B, 50C for simplicity). The new shard 50D will be empty, and will typically be added as part of a new database server 48 with includes the shard 50. The new shard 50D is added to fill a particular role due to the growth of data within a particular existing inventory database shard 50. The router 38 and shard determination logic 52 will thus be modified to include the new shard 50D and item data entries within an existing shard 50 may be move to the new shard 50D so that the inventory data is distributed appropriately among the shards 50.

Figure 12:
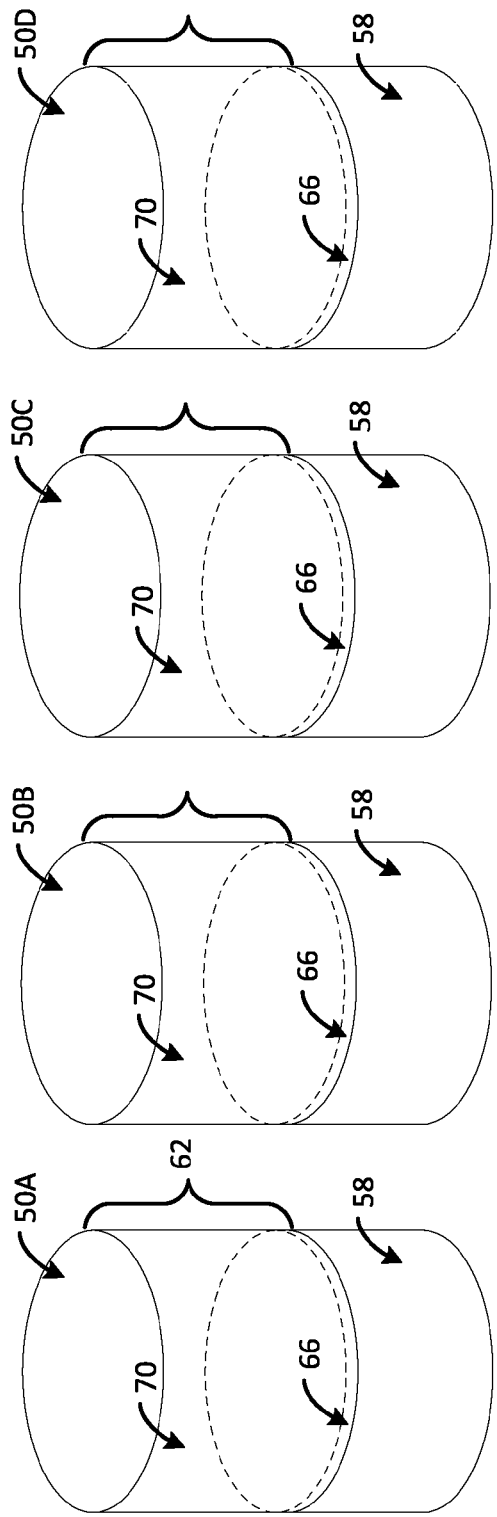

If, in an example system as discussed above, shards 50D and 50E corresponding to inventory of items for sale in an online marketplace no longer have sufficient operational capacity, a new shard 50F may be added to the inventory database. The shard determination logic in the example presented above may be modified to contain the following data:

Shard 50A—inventory of items for sale in store
Shard 50B—inventory of items for sale online: Electronics
Shard 50C—inventory of items for sale online: All other
Shard 50D—inventory of items for sale in online marketplace: Sellers A through H
Shard 50E—inventory of items for sale in online marketplace: Sellers I through P
Shard 50F—inventory of items for sale in online marketplace: Sellers Q through Z Data stored in existing shard 50E may be moved to new shard 50F consistent with the shard determination logic 52 and data store in existing shard 50D may be moved to shard 50E so that the inventory data stored in the shards 50 is consistent with the shard determination logic. In another example of shard management, once a shard reaches a threshold operational capacity, a new shard 50 may be added and new inventory may be added to the new shard without moving data from existing shards. FIG. 12 shows an example where each shard 50A, 50B, 50C, 50D is balanced according to the shard determination logic 52 after adding a new shard 50D into the inventory database.

This system 26 significantly improves performance by allowing the inventory database to be scaled horizontally to suit the demands of a particular retailer and to support an extremely high sales volume with accurate inventory information. The inventory database may be tailored to the nature and quantity of inventory which is present. The shard determination logic 52 does not need excessive complexity to allow the IMS application layer 56 to monitor, read, and update inventory data and the sharded database does not increase the time for communications between a customer computer 14 or order management system computer and a database server 48. Item information may itself indicate a database shard (such as by using the type and nature of the item, using a shard number as a particular digit in the order number or placing the shard number in a data field associated with the order).

Figure 13:
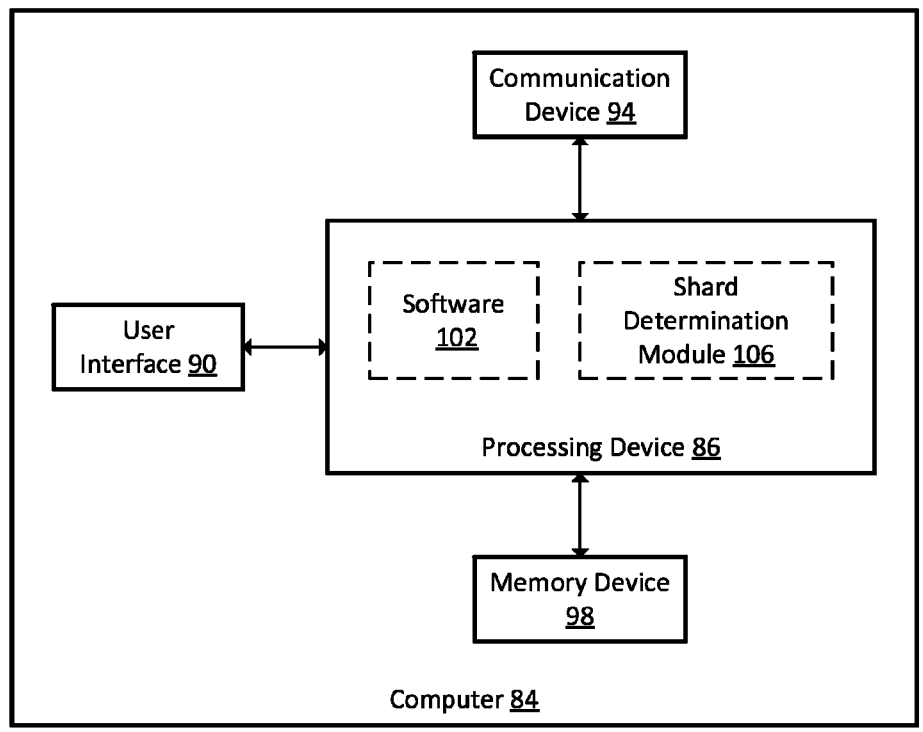
FIG. 13 is a schematic illustrating example components of a computer such as an order management server, inventory management server, or router.
Figure 14:
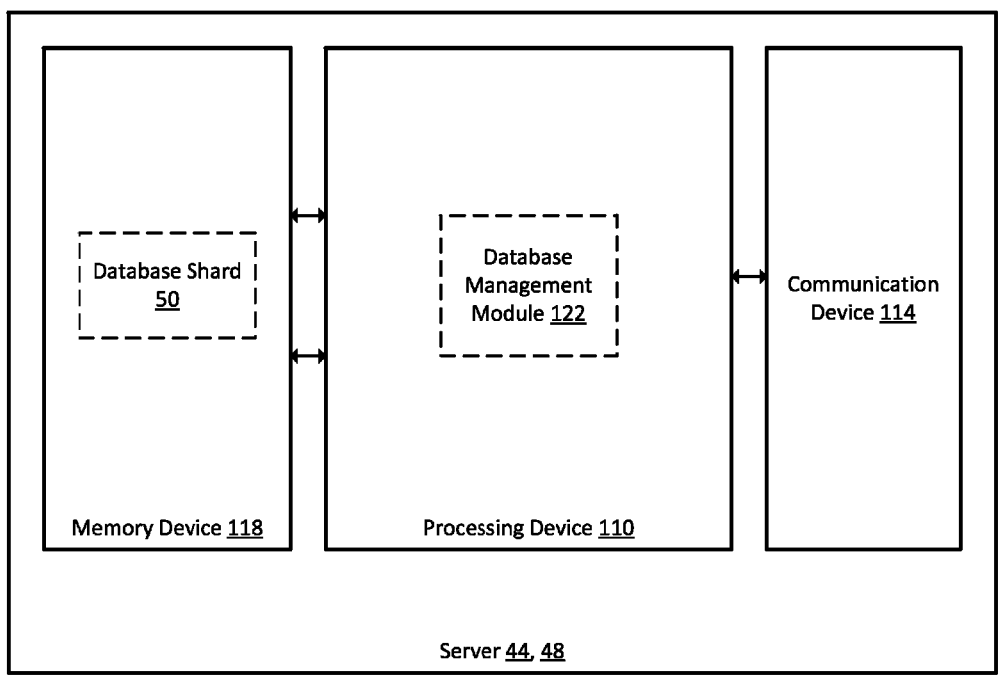
FIG. 14 is a schematic illustrating example components of a database server.

Referring now to FIG. 13, a schematic illustrating example components of a computer 84 such as a server 34, server 42, or router 38 is shown. As discussed, the router 38 may be a programmed computer or a dedicated hardware implementation. The computer 84 includes a processing device 86, a user interface 90, a communication device 94, and a memory device 98. It is noted that the computer 84 can include other components and some of the components are not required.

The processing device 86 can include memory, e.g., read only memory (ROM) and random access memory (RAM), storing processor-executable instructions and one or more processors that execute the processor-executable instructions. In embodiments where the processing device 86 includes two or more processors, the processors can operate in a parallel or distributed manner. The processing device 86 can execute the operating system of the computer 84. In one example, the processing device 86 may also executes a software module 102 (which may include an OMS application layer 54 and/or an IMS application layer 56) and a shard determination module 106 (which may include the order shard determination logic 46 and/or inventory shard determination logic 52). By way of example, where a single computer 84 implements an order management server 34 and router 38, an OMS application layer 54 and shard determination logic 46 may be included. Where a single computer 84 implements an inventory management server 42 and router 38, an IMS application layer 56 and shard determination logic 52 may be included. Where a single computer 84 implements an order management server 34, inventory management server 42, and router 38, an OMS application layer 54, IMS application layer 56, order shard determination logic 46, and inventory shard determination logic 52 may be included.

The user interface 90 is a device that allows a user to interact with the computer 84. While one user interface 90 is shown, the term "user interface" can include, but is not limited to, a touch screen, a physical keyboard, a mouse, etc. The communication device 94 is a device that allows the computer 84 to communicate with another device, e.g., the servers 34, 42, and 74. The communication device 94 can include one or more wireless transceivers for performing wireless communication and/or one or more communication ports for performing wired communication. The memory device 98 is a device that stores data generated or received by the computer 84. The memory device 98 can include, but is not limited to, a hard disc drive, an optical disc drive, and/or a flash memory drive.

The software module 102 may allow the computer 84 to interact with a customer, to interact with other computers within the store order management system 26, and to interact with other computers to create and manage orders. The software module 102 may facilitate the customer selection of items for purchase at an online store website and may assist in maintaining accurate inventory information in an inventory database as orders are created and fulfilled and as purchases and inventory replenishment and growth occur within a store 18.

The shard determination module 106 may include order shard determination logic 46 and/or inventory shard determination logic 52 and allows the computer 84 to analyze information regarding an order or inventory query or request and to identify a shard 50 pertaining to that query. The shard determination module 106 also allows the computer 84 to execute one or more other tasks as discussed herein. Particularly, the shard determination module 106 facilitates the communication between the computer 14, computer 84 and server 34 or server 42.

A computer in the order management system may store a customer database. In some instances, the computer 84 (e.g. an order management server 34) or a dedicated customer database server may store a customer database. The customer database may store information regarding specific customers, such as customer account information, customer contact information and preferences, customer order history, etc. The customer database may be queried by various devices in the order management system to record or retrieve information regarding customer orders and may assist in implementing the examples set forth.

Referring now to FIG. 8, a schematic illustrating example components of a database server such as an order database server 44 or inventory database server 48 is shown. The server 44, 48 may be programmed to perform one or more functions at the request of the router 38, server 34, server 42, server 74, and order management system 26 and, according to various computing models, may execute some or all of the functions associated with operation of the order management system 26. The server 44, 48 may include a processing device 110, a communication device 114, and a memory device 118.

The processing device 110 can include memory, e.g., read only memory (ROM) and random access memory (RAM), storing processor-executable instructions and one or more processors that execute the processor-executable instructions. In embodiments where the processing device 110 includes two or more processors, the processors can operate in a parallel or distributed manner. In the illustrative embodiment, the processing device 110 executes aspects of the order management system 26. For example, the processing device may execute a database management module 122 such as an order database management module or an inventory database management module depending on whether the server is an order server 44 or an inventory server 48. The database management module 122 allows the server to execute the various tasks associated with database operation and management as discussed herein. The inventory database management module may implement the OMS application layer 54 or IMS application layer 56 in whole or in part as necessary to manage the database.

The communication device 114 is a device that allows the server to communicate with another device, e.g., a router 38 and other computers within the store order management system 26. The communication device 114 can include one or more wireless transceivers for performing wireless communication and/or one or more communication ports for performing wired communication.

The memory device 118 is a device that stores data generated or received by the server. The memory device 118 can include, but is not limited to a hard disc drive, an optical disc drive, and/or a flash memory drive. Further, the memory device 118 may be distributed and located across multiple disc drives. The memory device 118 is accessible to the processing device 110. Particularly, the memory device 110 stores data such as an order or inventory database shard 50 which is executed by the server.

An order database shard 50 may store information about or associated with customer orders. An inventory database shard 50 can store information associated with items which are for sale such as products, UPC codes, descriptions, prices, etc. The database shard 50 may be queried by the processing device 110 and may provide information to the processing device to facilitate the operation of an order management system 26.

The system is advantageous as it provides a sharded order database and/or a sharded inventory database within an order management system which can accommodate massive order volumes such as tens of thousands of orders per minute without the overloading, delays, and loss of bandwidth to take orders that happen with a conventional system. The OMS application layer, IMS application layer, shard determination logic, and database management techniques allow a transactional database such as an order database or an inventory database to be sharded and allow the transactional database to be maintained at an operational size. The system can be implemented on existing servers and is transparent to customers.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example components, dimensions, voltages, currents, frequencies, power range values, times, etc., are provided for explanation purposes and that other values may also be employed in other embodiments and examples in accordance with the teachings of the present invention.

What is claimed is:

1. A scalable computer system for managing orders and inventory in a store that makes sales at a physical retail location, through an online storefront, and through an online marketplace where third party goods are sold to customers, the scalable computer system comprising:
   a sharded store order database that is horizontally scalable under an order management system application layer, the sharded store order database comprising:
      a first order database shard in a first order database server, the first order database shard having inventory data for a first group of orders, the first group of orders corresponding to first items which have been sold by the store at the physical retail location;
      a second order database shard in a second order database server, the second order database shard having order data for a second group of orders, the second group of orders corresponding to second items which have been sold by the store through the online storefront, the second group of orders being different than the first group of orders; and
      a third order database shard in a third order database server, the third order database shard having order data for a third group of orders, the third group of orders corresponding to the third party goods which have been sold through the online marketplace, the third group of orders being different than the first group of orders and the third group of orders being different than the second group of orders;
   a store order management computer system comprising:
      a computer processor;
      memory connected to the computer processor; and
      an order shard determination module programmed to:
         receive a first query regarding a first order to purchase a first ordered item from the store, wherein the first ordered item is one of the first items;
         identify a first order database shard associated with the first order;
         communicate data regarding the first order to the first order database shard;
         receive a second query regarding a second order to purchase a second ordered item from the store, wherein the second ordered item is one of the second items;
         identify a second order database shard associated with the second order;
         communicate data regarding the second order to the second order database shard;
         receive a third query regarding a third order to purchase a third ordered item, wherein the third ordered item is one of the third party goods;
         identify a third order database shard associated with the third order; and
         communicate data regarding the third order to the third order database shard.

2. The scalable computer system of claim 1, wherein the order shard determination module is more specifically programmed to:
   receive a new order from a customer to purchase an item;
   identify a location where the customer resides;
   identify a location order database shard which corresponds to the location where the customer resides; and
   store data regarding the new order on the location order database shard.

3. The scalable computer system of claim 1, wherein the order shard determination module is more specifically programmed to:
   receive a new order from a customer to purchase an item;
   perform a modulo operation on a sequence of the order to identify a modulo database shard; and
   store data regarding the new order on the modulo database shard.

4. The scalable computer system of claim 1, wherein the order shard determination module is more specifically programmed to:
   receive a new order from a customer to purchase an item;
   identify a round robin database shard in a round robin assignment;
   assign the new order to the round robin database shard; and
   store data regarding the new order on the round robin database shard.

5. The scalable computer system of claim 1, wherein the order shard determination module is more specifically programmed to:
   receive a new order from a customer to purchase an item;
   identify a customer attribute database shard based on attributes of the customer;
   assign the new order to the customer attribute database shard; and
   store data regarding the new order on the customer attribute database shard.

6. The scalable computer system of claim 1, wherein the order shard determination module is more specifically programmed to:
   receive a new order from a customer to purchase an item;
   identify an identified database shard for the new order;
   assign the new order to the identified database shard;
   store data regarding the new order on the identified database shard;
   embed a code associated with the identified database shard in an order identification number for the new order; and
   store the order identification number in an account associated with the customer.

7. The scalable computer system of claim 1, wherein the order shard determination module is more specifically programmed to:
   receive a new order from a customer to purchase an item;
   identify an identified database shard;
   assign the new order to the identified database shard;
   store data regarding the new order on the identified database shard;
   create an order identification number for the new order;
   store a code associated with the identified database shard in a data field associated with the order identification number; and
   store the order identification number and associated data field in an account associated with the customer.

8. The scalable computer system of claim 1, wherein the order shard determination module is more specifically programmed to:
   receive a query regarding a past order to purchase an item from the store;
   identify an identified database shard which stores information associated with the past order based on the information associated with the past order; and retrieve data regarding the past order from the identified database shard.

9. The scalable computer system of claim 1, wherein:
the first order database shard stores information for purchases made in a brick and mortar store location;
the second order database shard stores information for online purchases; and
the order shard determination module is more specifically programmed to:
receive a query regarding a purchase made by a customer;
determine whether the purchase was made online or in the brick and mortar store location;
identify an identified database shard associated with the purchase; and
retrieve data regarding the purchase from the identified database shard.

10. A computer system for managing orders and inventory in a store, the computer system comprising:
a sharded store order database that is horizontally scalable under an order management system application layer, the sharded store order database comprising:
a first order database shard in a first order database server, the first order database shard having inventory data for a first group of orders, the first group of orders corresponding to first items which have been sold by the store;
a second order database shard in a second order database server, the second order database shard having order data for a second group of orders, the second group of orders corresponding to second items which have been sold by the store, the second group of orders being different than the first group of orders;
a store order management computer system comprising:
a computer processor;
memory connected to the computer processor; and
an order shard determination module programmed to:
receive a query regarding an order to purchase an item from the store;
identify an identified order database shard associated with the order; and
communicate data regarding the order to the identified order database shard;
wherein:
the first order database shard stores information for purchases made in a brick and mortar store location;
the second order database shard stores information for online purchases; and
the order shard determination module is more specifically programmed to:
receive a query regarding a purchase made by a customer;
determine whether the purchase was made online or in the brick and mortar store location;
identify an identified database shard associated with the purchase; and
retrieve data regarding the purchase from the identified database shard.

11. The computer system of claim 10, wherein the order shard determination module is more specifically programmed to:
receive a new order from a customer to purchase an item;
identify a location where the customer resides;
identify a location order database shard which corresponds to the location where the customer resides; and
store data regarding the new order on the location order database shard.

12. The computer system of claim 10, wherein the order shard determination module is more specifically programmed to:
receive a new order from a customer to purchase an item;
identify a round robin database shard in a round robin assignment;
assign the new order to the round robin database shard; and
store data regarding the new order on the round robin database shard.

* * * * *